United States Patent [19]
Crawford et al.

[11] 3,850,780
[45] Nov. 26, 1974

[54] EXTENDED DWELL HEAT SEALER

[75] Inventors: Donald C. Crawford; Michael R. Nack, both of Green Bay, Wis.

[73] Assignee: FMC Corporation, San Jose, Calif.

[22] Filed: June 4, 1973

[21] Appl. No.: 367,057

Related U.S. Application Data

[63] Continuation of Ser. No. 173,980, Aug. 23, 1971, abandoned.

[52] U.S. Cl. ............... 156/583, 53/182, 83/324, 83/337
[51] Int. Cl. ............... B30d 15/34, B23d 25/02
[58] Field of Search ...... 156/583, 521, 515; 53/182; 83/324, 337

[56] References Cited
UNITED STATES PATENTS

| | | | |
|---|---|---|---|
| 2,546,721 | 3/1951 | Campbell | 53/33 |
| 3,028,294 | 4/1962 | Histed | 156/583 |
| 3,439,471 | 4/1969 | Kraft | 53/182 |
| 3,522,135 | 7/1970 | Page | 156/583 |
| 3,560,312 | 2/1971 | Smith | 156/583 |

FOREIGN PATENTS OR APPLICATIONS

| | | | |
|---|---|---|---|
| 1,270,478 | 6/1968 | Germany | 156/583 |

*Primary Examiner*—Douglas J. Drummond
*Attorney, Agent, or Firm*—C. E. Tripp

[57] ABSTRACT

A modified rotary motion is imparted to heated sealing jaws on counterrotating shafts straddling a web to be sealed, so that the jaws are directed along linear paths while in sealing engagement with the web. Each sealing jaw support is provided with follower rollers engaged with stationary cams coaxially located relative to an adjacent cutting head shaft, and the drive train incorporates a cam for providing a constant velocity for the sealing jaws when engaging the web. Electrical power is routed by means including thin and wide conductor loops which flex to follow their respective sealing jaws.

8 Claims, 10 Drawing Figures

FIG_1
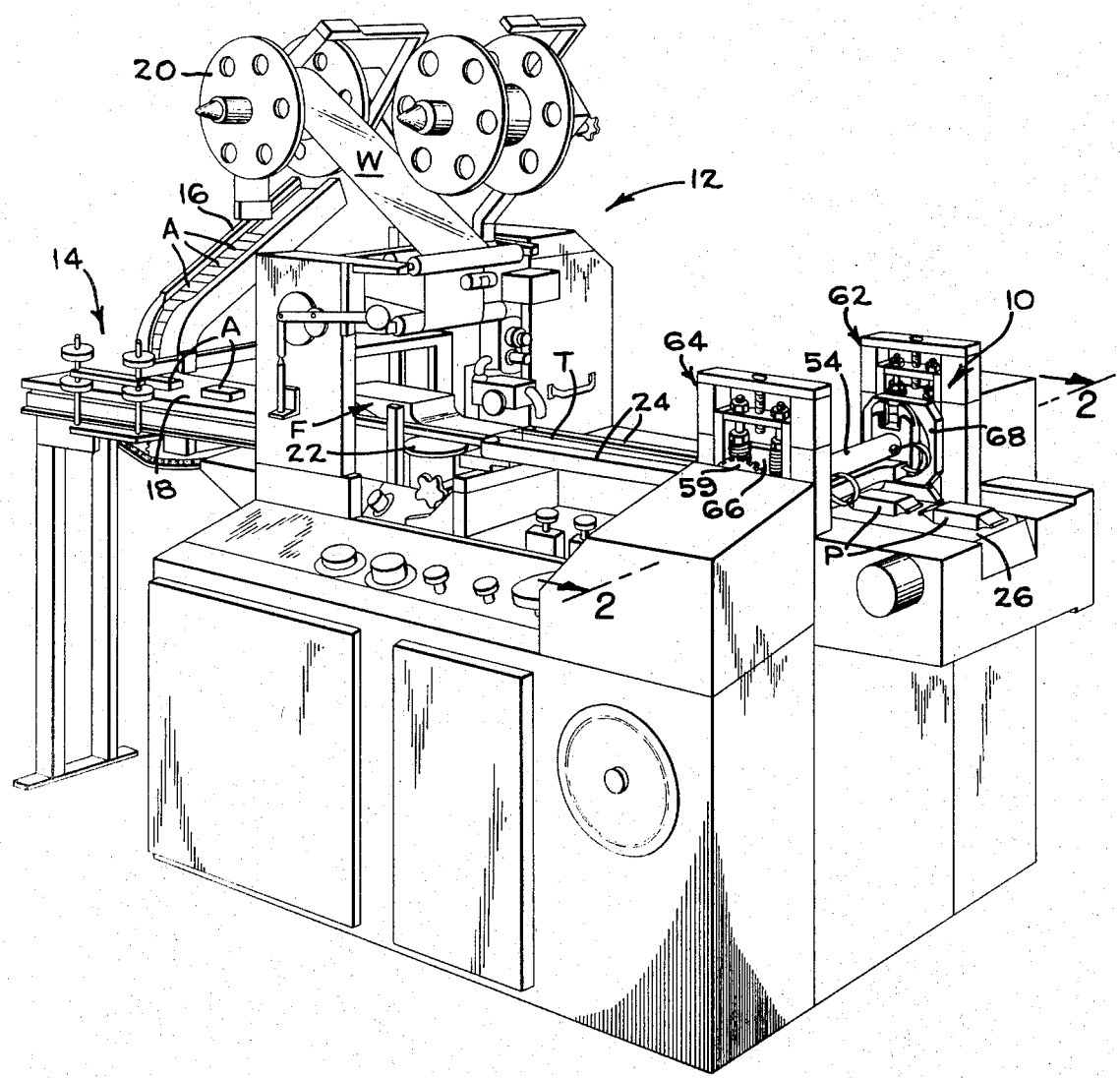

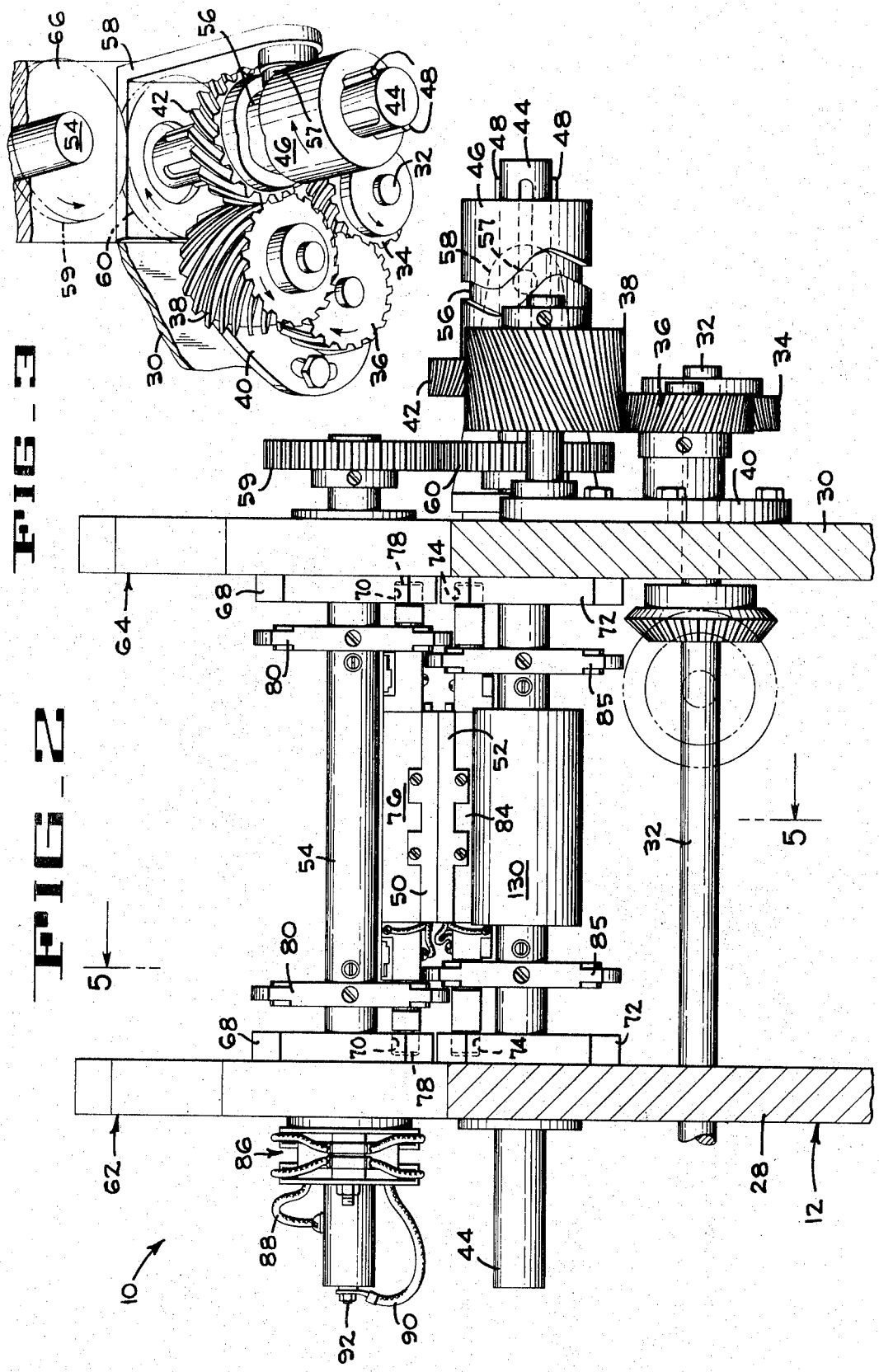

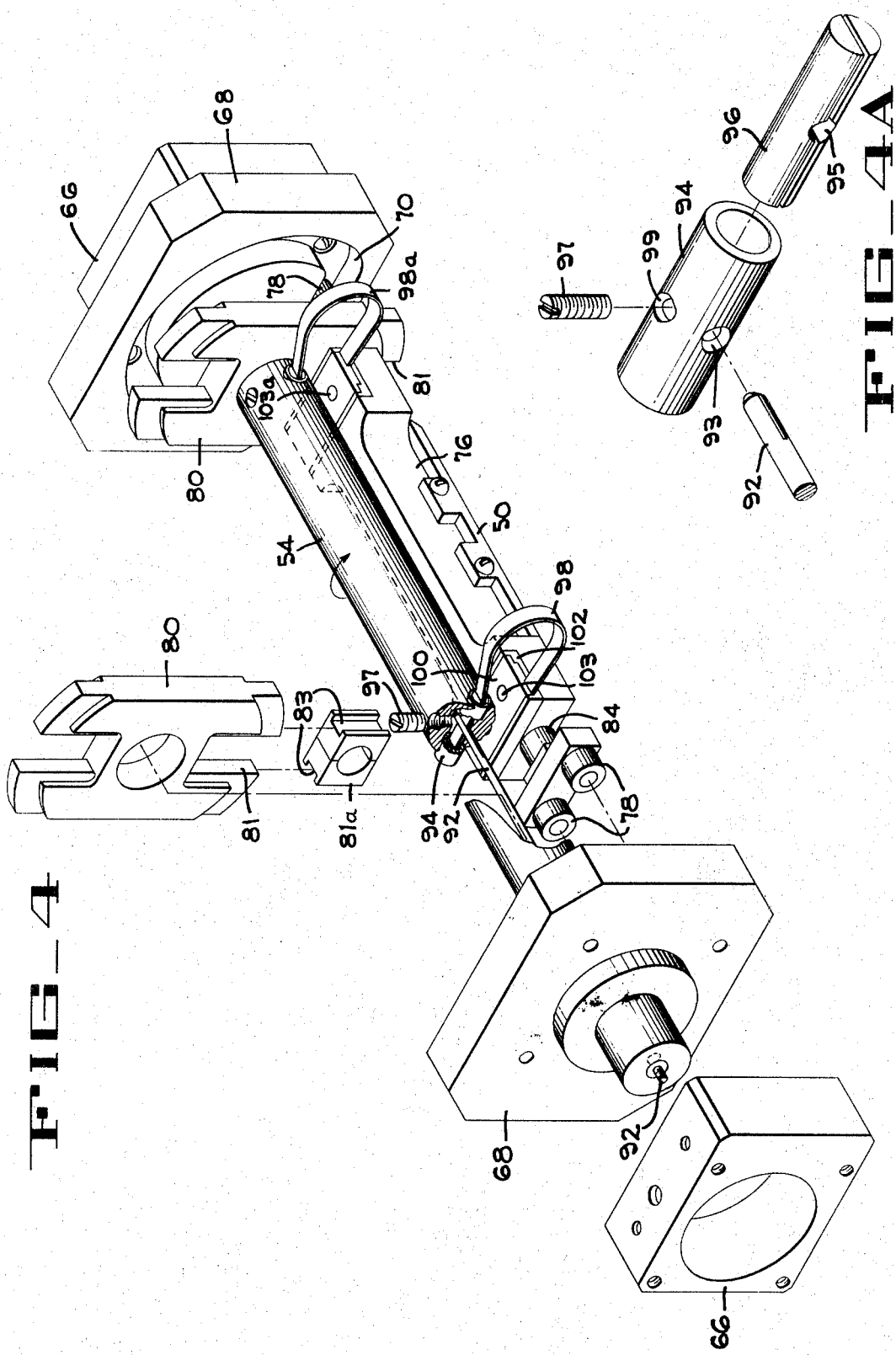

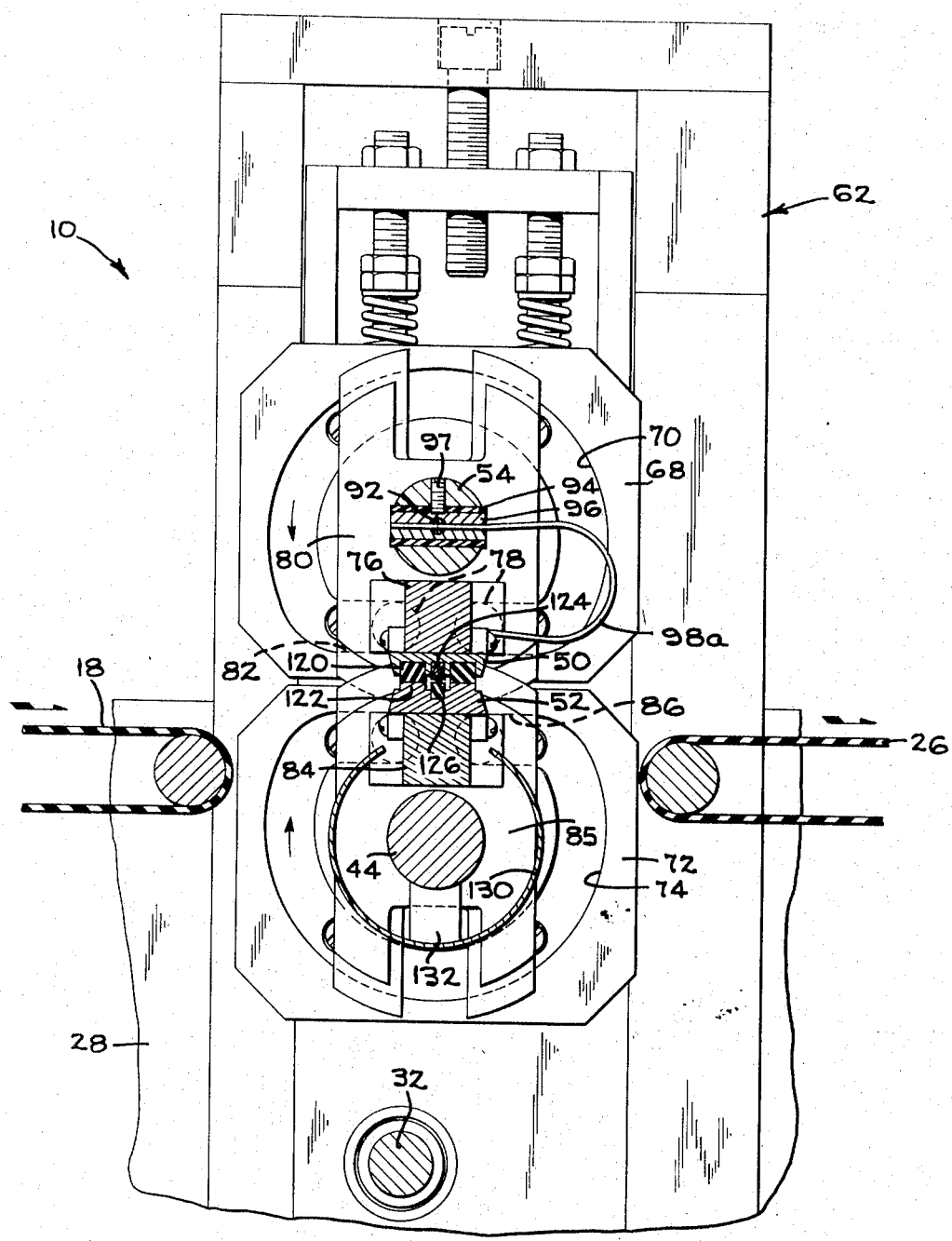
FIG_5

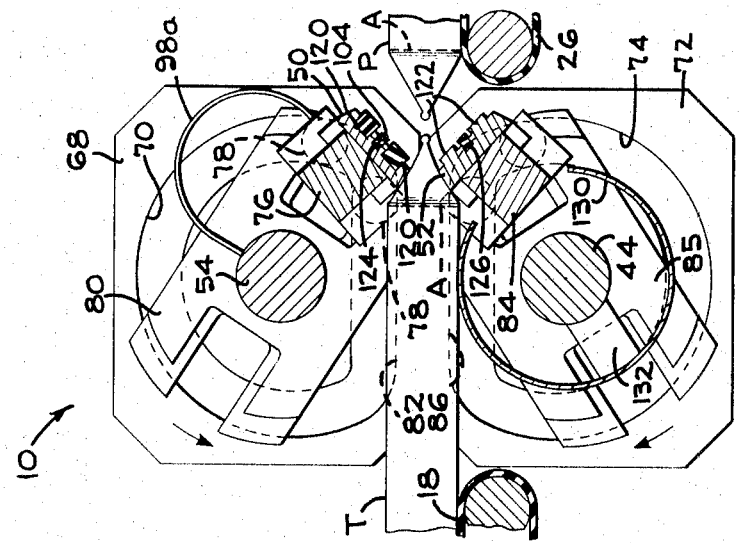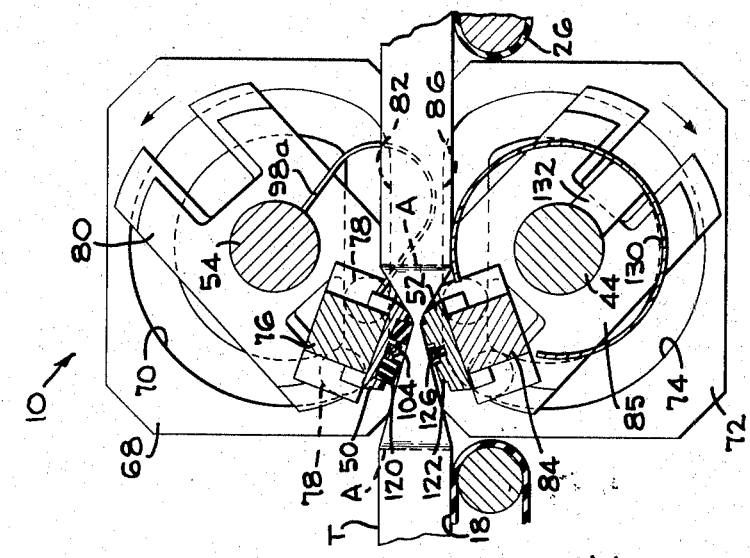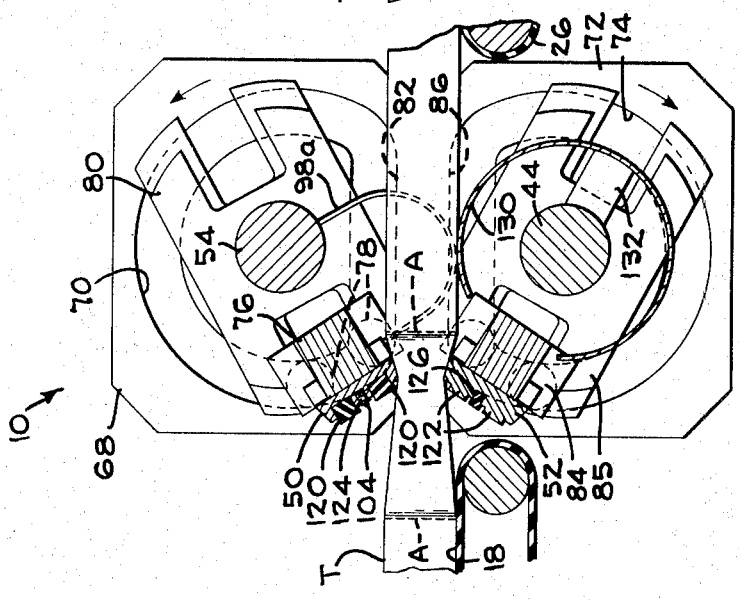

EXTENDED DWELL HEAT SEALER

This is a continuation of application Ser. No. 173,980, filed Aug. 23, 1971, now abandoned.

BACKGROUND OF THE INVENTION

The present invention pertains to wrapping or bag making machines for heat sealing thermoplastic web materials. More specifically, the invention concerns rotary sealing heads, which in the usual installation includes two counterrotating shafts carrying one or more heated sealing jaws. One typical wrapping machine employing a rotary heat sealing head is disclosed in U.S. Pat. No. 2,546,721.

DESCRIPTION OF THE PRIOR ART

A general disadvantage of all rotary sealing head wrapping machines is that the required production speeds are not always capable of being achieved with web materials such as polyethylene or some laminated structures that require the sealing jaws to have long periods of sealing contact with the web. Operating conditions are further complicated because obtaining acceptable seals depends upon many different interrelated factors, such as heat, pressure, web material and thickness, as well as sealing time. Even if all of these conditions, apart from sealing time, can be met, rotary heat sealers inherently have a limited sealing dwell time which in itself limits the production rate.

In the above identified patent, the arc subtended by the web contact area of a sealing jaw is generally 10°, or less. Therefore, a given point on the web is in pressure contact with the sealing jaws for a time not exceeding the time required for 10° of rotation of the jaws.

One solution to the problem of obtaining a prolonged sealing contact with a heat sealable web is disclosed in the Pratt U.S. Pat. 3,290,202. While this patented structure is stated to achieve web engagement for as long as 30° at each side of center position, with other than merely line contact between the sealing jaws it is necessary to mount the sealing jaws for rocking movement so that at the earliest possible time in the sealing operation one jaw will lie flat against the other sealing jaw and the web gripped therebetween. Also, it is believed accurate that a sealing head structure operating in general accord with this patented device will be characterized by a certain complexity and large number of parts, including gears which require precision machining and assembly to achieve the accuracy required for most applications.

An ideal sealing head mechanism for providing an extended dwell time during sealing should include a minimum number of parts to facilitate dependable, consistent and accurate velocity control, and preferably should be associated with a drive system incorporating positive velocity control of the sealing jaws. The present invention provides a sealing head meeting these criteria.

SUMMARY OF THE INVENTION

By providing modified rotary motion for a sealing head assembly with upper and lower cams having linear and parallel adjacent tracks, and dual follower rollers for each end of the upper and lower sealing jaw supports, the sealing jaws are maintained in flat engagement with the web for at least 40° of each 360° sealing cycle and provide a sealing dwell time about four times longer than usual. In one embodiment incorporating a hot wire sealing and cutoff member for polyethylene films, and freedom for the web to shrink at each side of the seal line, the seal is consolidated while the web remains clamped. By providing a known arrangement of relatively sliding helical gears controlled by a barrel cam in the drive train for the sealing head assembly, the velocity of the sealing jaws can be precisely matched with the velocity of the web during the extended dwell period for sealing and severing the web.

BRIEF DESCRIPTION OF THE DRAWINGS

FIG. 1 is a perspective of a known type of rotary motion, continuous wrapping machine incorporating the extended dwell time sealing head of the present invention.

FIG. 2 is an enlarged transverse section indicated generally by lines 2—2 on FIG. 1.

FIG. 3 is a perspective of the drive gears shown in FIG. 2.

FIG. 4 is a fragmentary exploded perspective of the upper portion of the sealing head structure.

FIG. 4A is an enlarged exploded isometric of an insulating assembly used in the structure shown in FIG. 4.

FIG. 5 is an enlarged section taken along lines 5—5 on FIG. 2.

FIGS. 7–9 are diagrammatic operational views illustrating sequential operating positions of the FIG. 5 apparatus during the sealing and severing of a web enclosing a series of entubed articles.

DESCRIPTION OF THE PREFERRED EMBODIMENTS

Figure 6:
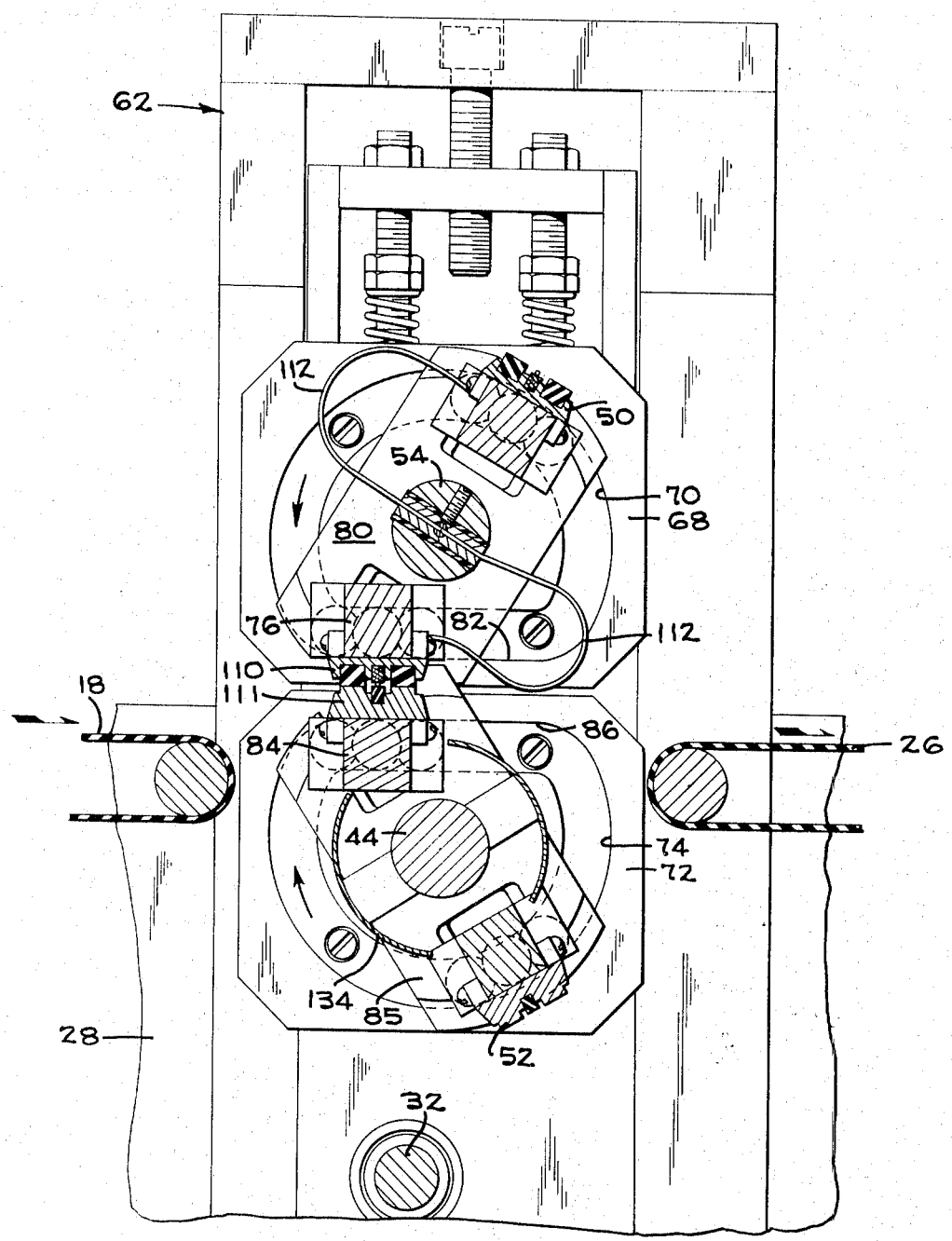
FIG. 6 is an enlarged section similar to FIG. 5, but of a modified embodiment of the invention including dual or two-up sealing jaws.

The present invention is directed to an improved sealing head assembly 10 (FIG. 1) which has utility with a variety of different continuous wrapping machines, one of which is indicated by the general reference numeral 12. The wrapping machine 12, one form of which is described in U.S. Pat. No. 2,546,721, includes an input end 14 at which individual articles A are fed into the machine by a delivery conveyor 16. The articles are deposited upon a moving conveying surface 18 and travel continuously in single file, spaced relation throughout the wrapping machine 12, to be entubed in a longitudinally sealed web which is then transversely sealed and severed; the articles are ejected at the discharge end of the machine as single packages P.

Due to the special advantages afforded by the sealing head assembly 10, the wrapping material which is employed may comprise a heat sealable film that requires an extraordinarily long time for sealing and/or severing, such as a polyethylene film or a laminated film, without slowing down the movement of the articles to achieve the extra time required for sealing. In other words, a relatively high production rate of finished packages is achieved in a wrapping machine employing the sealing head assembly 10, whereas some wrapping machines using ordinary rotary sealing heads must operate more slowly to attain adequate sealing time with the same type of web, and the outputs of those machines are correspondingly lower.

As in conventional wrapping machines, a web W (FIG. 1) is drawn from a supply spool 20 of wrapping material and is directed around various guide rollers to a forming station wherein a web former F curls the lateral edges of the web W to form a tube T (FIGS. 7-9) around the articles, and the tube is longitudinally sealed, while moving, by appropriate means such as the illustrated sealing wheel 22. The tube T is then conveyed by suitable means, such as lateral gripping belts 24, to the sealing head assembly 10 which transversely grips the tube between adjacent articles and both heatseals and severs the web between the gripped areas. Downstream of the sealing head assembly 10, the thus produced individual packages P are deposited upon a discharge conveyor 26 to be packaged or otherwise disposed of.

It should be noted, before the sealing head assembly 10 is described, that wrapping machines of the type shown are usually modified for a customer's particular requirements. Thus, some wrapping machines might employ a rotary sealing head assembly which only seals the web, and a second rotary head assembly which only severs the web. Further, some rotary heads incorporate heated crimping and sealing jaws in straddling relation with a mechanical knife. No one particular sealing and severing mechanism is critical to the present invention, the broad aspect of which is a mechanism for extending the period of web contact by whatever sealing, severing or other web contacting mechanism may be used, yet a mechanism which operates at high production rates. Accordingly, the term cutting head, or sealing head, is intended to encompass any type of rotary head carrying a mechanism which requires web contact longer than is usual to perform its function most efficiently.

Referring to FIG. 2, the wrapping machine 12 includes spaced frame plates 28 and 30, with a main driveshaft 32 extending through the plates and driven, by means not shown, in timed relation with the other operating components of the machine. To transfer driving power to the sealing head 10, the main driveshaft 32 carries a helical gear 34 (FIG. 3) which drives two intermeshed helical gears 36 and 38 mounted on a bracket 40. Bracket 40 is adjustably pivotable about the axis of the gear 36 so that the gear 38 can be removably engaged with a helical gear 42 on a lower cutting head shaft 44; this is for the purpose of setup adjustments to accommodate package height, and also so that the wrapping machine can be run during adjustment without driving the cutting head. A barrel cam 46 is secured to the gear 42 and slides axially with the gear along drive keys 48 that are fixed to the cutting head shaft 44.

The general function of the barrel cam 46 and the train of helical gears 34, 36, 38, 42, is to provide varying instantaneous velocities for a sealing jaw 50 and a sealing jaw 52, jaw 50 being driven by an upper cutting head shaft 54 and jaw 52 being driven by the lower cutting head shaft 44. With this drive system, the sealing jaws contact and move at the same velocity as the web, and then rotate at a mean velocity which will allow free passage of the article being wrapped and then index the sealing jaws with the next area of the web between adjacent articles. For this purpose, the barrel cam 46 is provided with a camming groove or track 56, and a fixed cam roller 57 is seated in the groove and mounted on a bracket 58. Thus, the rotation imparted to the helical gear 42 by the described drive train, causes the barrel cam 46 and the gear 42 to shift axially back and forth on the lower cutting head shaft 44, the gear 38 being wide enough to always maintain mash with the gear 42.

It is evident that because of the angular disposition of the helical teeth on the gear 42, inward movement of the gear 42 from the position shown in FIG. 3 will impart clockwise movement to the gear 42, in addition to the rotation imparted by the train of gears 34, 36 and 38. Therefore, when the cam track 56 slides the gear 42 inward, the rotation of the lower cutting head shaft 44 is accelerated, and when the gear 42 returns outward to the FIG. 3 position, the shaft 44 decelerated. This acceleration and deceleration, as later described in detail, is to provide constant velocity for the cooperative upper and lower sealing jaws 50 and 52 (FIG. 2) when the sealing jaws are in gripping and prolonged contact with the web. In order to drive the upper and lower sealing jaws in synchronism, the upper cutting head shaft 54 is associated with a gear 59 that is meshed with a gear 60 fixed to the lower cutting head shaft 44.

Mounting means for the upper and lower cutting head shafts 54 and 44 is conventional, and includes vertical slides 62 and 64, best shown in FIG. 1, which retain bearing blocks 66 (FIG. 4), for the cutting head shafts. To this conventional shaft mounting structure, the present invention provides cams for regulating the paths of the sealing jaws 50 and 52. Secured to the inner face of each bearing block 66 for the upper cutting head shaft 54 is a cam block 68 having a cam groove 70. The cam groove 70 is symmetrical relative to the shaft 54, and the two cam blocks are thus interchangeable. Similarly, the lower cutting head shaft 44 extends through two cam blocks 72 which are secured to associated lower bearing blocks, not shown, and have cam grooves 74 that are similar to the cam grooves 70, but inverted.

The upper sealing jaw assembly (FIG. 2) includes an elongate support bar 76 which at each end mounts a pair of cam rollers 78, as best shown in FIG. 4. The cam rollers are engaged with the adjacent cam track 70 to guide the support bar 76 and its attached sealing jaw 50 as the assembly is driven in an orbit about the axis of the upper cutting head shaft 54. For connecting the cutting head shaft to the sealing jaw assembly, a drive member 80 is secured to each end portion of the cutting head shaft. A forked or yoke end 81 of each drive member straddles a split bushing or slide block 81a which is mounted on a journal portion 84 of the support bar 76 and is provided with grooved edges 83 for sliding movement relative to the drive member 80. For installations which require two opposed sealing jaws mounted on a common shaft, the drive member 80 is provided with two forked ends, as shown. As thus far described, it is apparent that the sealing jaw 50 is positively driven by the yoke ends 81 of the drive members 80, even though the radial distance from the shaft 54 to the sealing jaw 50 varies due to the action of the cam tracks.

The upper sealing jaw 50 (FIG. 5) moves toward the axis of the upper cutting head shaft 54 when the sealing jaw support bar 76 tranverses a lower linear portion 82 of the cam track 70. At the same time, the lower sealing jaw 52 moves toward the axis of the lower cutting head shaft 44 when its associated support bar 84, powered by drive members 85 from the shaft 44, traverses a linear portion 86 of the cam track 74. When the leading cam follower roller 78 (FIG. 5) of the sealing jaw support bar 76 enters the linear portion 82 of the cam groove 70, the sealing jaw support bar 76 is about at its maximum radial distance from the axis of the upper cutting head shaft 54, and this distance of course diminishes as the support bar 76 moves toward bottom dead center. Thus, when the sealing jaw 50 is guided along the linear cam portion 82, if the cutting head shaft 54 rotated at constant velocity the sealing jaw would decelerate while approaching bottom dead center, and accelerate from that point to the arcuate portion of the cam track.

In order to provide constant velocity for the sealing jaws 50 and 52 while they confront each other and grip the web therebetween, the barrel cam 46 (FIG. 3) provides a velocity correction for the cutting head shafts 44 and 54, to first accelerate the shafts as the sealing jaws move toward the midpoint of their linear travel, and to then decelerate the shafts when the jaws travel beyond midpoint. By this arrangement, the sealing jaws 50 and 52 have a constant velocity the same as the web velocity during the entire time of prolonged web engagement afforded by the linear travel of the sealing jaws.

Returning to FIG. 2, it will be noted that the lower shaft 44 drive members 85 are offset from the drive members 80 on the upper shaft. By overlapping the drive members 80 and 85, driving engagement with the support shaft 76 and the support shaft 84 for the lower sealing jaw 52 can be at the maximum distance from the axes of the upper and lower cutting head shafts 54 and 44 so as to provide a prolonged dwell for the sealing jaws but with a compact mechanism.

In addition to the extended dwell and the constant web velocity features mentioned above, another feature of the present invention is the provision of a highly efficient and reliable structure for supplying relatively high amperage current to whatever heating elements are used, without impairing the free movement of the sealing jaw 50 toward and away from the cutting head shaft 54. Electrical power is routed to the shaft 54 (FIG. 2) by a conventional slip ring unit 86 having one conductor 88 grounded to the shaft, and a second conductor 90 which is connected to the outer end of a conductor rod 92. Rod 92 extends through insulator bushings mounted in an axial bore of the cutting head shaft 54, and has a slotted inner end (FIG. 4A) which intersects a transverse aperture in the shaft 54. Mounted in said aperture is cylindrical nylon sleeve 94 which retains a split nylon bushing 96.

The slotted inner end of the conductor rod or electrode 92 extends through apertures 93 and 95 of members 94 and 96, and grips a flat conductor 98. To lock this assembly, a set screw 97 in the shaft 54 extends downward through an aperture 99 in the sleeve 94, and closes the split bushing 96 to tightly grip the flat conductor 98. To withstand repeated flexure at elevated temperatures, the conductor 98 may be formed, for example, of beryllium copper, and the advantage of its flat, wide shape is that the conductor readily flexes, yet its cross sectional area can be as large as necessary to handle relatively large electrical currents.

As shown in FIG. 4, the conductor 98 is recurved toward the sealing jaw support bar 76, and lies under a block 100 which is seated against an insulator block 102. Bolts 103, only one of which is shown, extend through the support bar 76 and through internal insulating bushings, not shown, to clamp the flat conductor 98 to the bar 76 while keeping the conductor electrically isolated. One of the bolts 103 provides a live terminal for a nichrome wire 104 (FIG. 7) which both seals and severs the polyethylene wrapping tube. The other end of the nichrome wire 104 is connected to a second flat conductor 98a (FIG. 4), the overall assembly of which is similar to that described for the conductor 98, except that the bolt 103a is not electrically isolated from the support bar 76, and the conductor 98a is electrically grounded to the cutting head shaft 54 so as to provide a positive electrical ground for the adjacent end of the nichrome wire 104.

It should be noted that different types of sealing heads can be used, depending upon the requirements of a particular installation, and with only minor changes to the structure thus far described. For example, if the sealing head assembly 10 is to be employed with a laminar film web, cartridge type heaters for the sealing jaws may be used with the electrical connections already described. In cases where both the upper and lower sealing jaws 50 and 52 (FIG. 2) require heater elements, the lower cutting head shaft 44 is also fitted with a slip ring unit 86 in the same manner described for the upper shaft 54. If "two-up" or dual sealing jaws are required on one shaft, power is routed in the manner shown in FIG. 6, and the added upper sealing jaw 110 and lower sealing jaw 111 are operated by the same drive members 80 and 85. In this case, a flat conductor 112 of elongate S-shape extends through the upper shaft 54 to serve both sealing jaws 50 and 110.

As best shown in FIG. 7, the sealing jaw 50 is recessed for the mounting of two narrow presser bars 120 of silicon rubber to apply clamping pressure to the web when the bars index with corresponding metal ribs 122 on the sealing jaw 52. The nichrome wire 104 is insulated from the sealing jaw 50 by a narrow Transite bar 124, and has lateral clearance with the presser bars 120. When the sealing jaws are indexed together, for example as shown in FIG. 5 for the midpoint of their extensive indexed travel, the nichrome wire 104 operates against a silicon rubber anvil bar 126 of the lower sealing jaw 52.

With reference to the sequential operational positions shown in FIGS. 7–9 for the sealing head assembly 10, the initial stages of a sealing and severing operation for the tubular web T between adjacent entubed articles A begins as the sealing jaws 50 and 52 begin to close together and pinch the web tube near the trailing end of the leading article. At this time the leading article A is supported by the discharge conveyor 26 and by a rotating article support 130. The article support 130 is in the form of an interrupted cylinder mounted to the lower cutting head shaft 44 by an elongate bar 132, the longitudinal edges of the cylinder terminating close to the support bar 84 of lower sealing jaw assembly. In the case of the two-up sealing heads shown in FIG. 6, the article support 134 is formed in two sections.

By the time the sealing jaws 50 and 52 (FIG. 8) have moved into flat engagement with the web as shown in FIG. 6 for the sealing jaws 110 and 111 (when the cam follower rollers of the sealing jaw support bars 76 and 84 are level and seated on the horizontal linear tracks of the cam blocks 68 and 72) the hot nichrome wire 104 is about 20 degrees from bottom dead center of the upper cutting head shaft 54 and in full sealing and severing engagement with the tube T. It is important to note that when the sealing jaws move from the FIG. 8 position where the nichrome wire 104 is not engaging the web, to flat engagement with each other as shown in FIG. 6, the cutting head shafts 54 and 44 rotate only about 17°. Thus, once the sealing jaws begin to pinch the web tube T, sealing and severing of the web occurs rapidly, and cooling and consolidation of the sealing and severing zone of the web then takes place for substantially 40° of one 360° cycle, whereupon the sealing jaws release the tube as shown in FIG. 9. As contrasted with the ordinary rotary heads, previously mentioned, which provide only about 10° of a 360° cycle for sealing, the sealing head assemble 10 will therefore provide a sealing operation about four times longer. Meanwhile, the drive mechanism for the sealing jaws, which includes the barrel cam 46 (FIG. 3), provides velocity corrections of the power train to the sealing jaws which maintains their linear velocity the same as the velocity of the web tube T so that there is no relative motion between the web and jaws.

Further aspects of the present invention which are considered commercially important are the adaptability of the sealing head assembly into existing rotary web handling machines, high reliability and accuracy due to the relatively small number of parts and their mode of operation, and, of course, the high speed operation which is possible with the modified rotary motion principle employed.

Although the best mode contemplated for carrying out the present invention has been herein shown and described, it will be apparent that modification and variation may be made without departing from what is regarded to be the subject matter of the invention.

We claim:

1. In a web handling machine for advancing a web and having a web contacting device such as a seal bar or the like, a control system for said web contacting device comprising a driven rotary shaft extending across the path of a moving web, laterally spaced drive yokes mounted on said shaft and straddling the web, a support bar parallel to said shaft, a slide block rotatably mounted on each end of said support bar and slidably mounted on the adjacent drive yoke for movement toward and away from the axis of said shaft, cam follower means mounted on each end of said support bar, camming means engaged by each of said cam follower means for guiding said support bar in an irregular orbit about the axis of said shaft, said orbit including a path parallel to the path of web motion, a web contacting device carried by said support bar, and a drive train connected to said driven shaft for regulating the instantaneous angular velocity of said shaft to render the velocity of said web contacting device along said path equal to that of the web.

2. Apparatus according to claim 1 and a heated element mounted on said web contacting device, a thin and wide solid metallic recurved electrical conductor connected to said heated element, and insulating means connecting the other end of said conductor to said shaft, said conductor having a relatively large cross sectional area and its narrow dimension transverse to said shaft to accommodate repeated flexure and large electrical currents without inhibiting the relative motion between said shaft and said web contacting device.

3. Apparatus according to claim 1 and interrupted conveying means at each side of said shaft for supporting the moving web, and a web support member secured to said shaft for rotation therewith, said member comprising a circumferentially interrupted hollow cylinder terminating in edges adjacent said web contacting device, said member being in supporting relation with said web when said web contacting device is remote from the web.

4. Apparatus according to claim 2 wherein said insulating means includes a dielectric plug extending transversely through said shaft and enclosing said conductor, said shaft having an axial bore intersecting said plug, and an electrode in said bore having a forked end extending into a transverse aperture of said plug in gripping relation with said conductor.

5. In a web handling machine having a seal bar, a velocity control system for said seal bar comprising a driven shaft extending across the path of a moving web, a drive yoke mounted on each end portion of said shaft, two support bars straddling said shaft, a rotatable slide block mounted on each end of said support bars in sliding engagement with the adjacent drive yoke, cam follower means projecting from each end of said support bars, camming means engaged by each of said cam follower means for guiding said support bar in an irregular orbit about the axis of said shaft, said orbit including a path parallel to the web, a seal bar carried by each of said support bars, an electrically heated element mounted on each of said seal bars, a thin and wide solid metallic electrical conductor extending through said shaft, said conductor being recurved at each side of said shaft and connected to the adjacent one of said electrically heated elements, said conductor having a relatively large cross sectional area and its narrow dimension transverse to said shaft to accommodate repeated flexure from the relative motion between said shaft and said heated elements, and a drive train connected to said driven shaft for regulating the instantaneous angular velocity of said driven shaft.

6. In a web handling machine for advancing a heat sealable web and having a web contacting device including an electrically heated seal bar or the like, a control system for said web contacting device comprising driven rotary shaft means extending transversely of the path of a moving web, laterally spaced drive yokes mounted on said shaft means and straddling the web, a support bar parallel to the shaft means, a slide block rotatably mounted on each end of said support bar and slidably mounted on the adjacent drive yoke for movement toward and away from the axis of said shaft means, cam follower means mounted on each end of said support bar, camming means engaged by each of said cam follower means for guiding said support bar in an irregular orbit about the axis of said shaft means, said orbit including a path parallel to the path of web motion, an electrically heated web contacting device carried by said support bar, means defining an electrical conductor for conducting electricity to said electrically heated web contacting device, and a drive train connected to said driven shaft for regulating the instantaneous angular velocity of said shaft to render the velocity of said web contacting device along said path equal to that of the web.

7. An apparatus according to claim 6 and a heat element included in said electrically heated web contacting device, said electrical conductor means including a thin and wide solid metallic curved electrical conductor connected to said heated element, and electrical conduit means extending into said shaft means and connected to said flat conductor, said flat conductor having a relatively large cross sectional area and its narrow dimension being transverse to said shaft means to accommodate repeated flexure and large electrical currents without inhibiting the relative motion between said shaft and said web contacting device.

8. In a web handling machine having a seal bar, a velocity control system for said seal bar comprising a driven rotart shaft means extending transversely of the path of a moving web, a drive yoke mounted on end portions of said shaft means on opposite sides of said web, a support bar extending parallel to said shaft, a rotatable slide block mounted on each end of said support bar in sliding engagement with the adjacent drive yoke, cam follower means projecting from each end of said support bar, camming means engaged by each of said cam follower means for guiding said support bar in an irregular orbit about the axis of said shaft, said orbit including a path parallel to the web, a seal bar carried by said support bar, an electrically heated element mounted on said seal bar, first electrical conductor means extending into said shaft means, a thin and wide solid metallic electrical conductor connected to said first conductor, said thin and wide conductor being curved at one side of said shaft and connected to said electrically heated element, said thin and wide conductor having a relatively large cross sectional area and its narrow dimension being transverse to said shaft to accommodate repeated flexure from the relative motion between said shaft and said heated element, and a drive train connected to said driven shaft for regulating the instantaneous angular velocity of said driven shaft.

* * * * *